United States Patent [19]

Mertens

[11] Patent Number: 4,893,595
[45] Date of Patent: Jan. 16, 1990

[54] DAMPING BLOCK DESIGNED IN PARTICULAR FOR MOUNTING AN ENGINE IN A MOTOR VEHICLE

[75] Inventor: Theobald Mertens, Niederfischbach, Fed. Rep. of Germany

[73] Assignee: General Motors Corporation, Detroit, Mich.

[21] Appl. No.: 211,796

[22] Filed: Jun. 27, 1988

Related U.S. Application Data

[63] Continuation-in-part of Ser. No. 135,009, Dec. 18, 1987, Pat. No. 4,829,953.

[30] Foreign Application Priority Data

Jul. 25, 1987 [DE] Fed. Rep. of Germany ....... 3724771

[51] Int. Cl.$^4$ .......................... F16F 1/52; B60K 5/12
[52] U.S. Cl. ................. 123/192 R; 180/300; 180/312; 267/152; 267/257; 267/292
[58] Field of Search .......... 123/192 R, 195 R, 195 A, 123/198 E; 248/638, 659; 180/300, 902, 312; 267/152, 153, 257, 258, 292, 140.1, 140.2, 141.1

[56] References Cited

U.S. PATENT DOCUMENTS

| 2,162,714 | 6/1939 | Hamblin | 267/141.1 |
| 2,357,740 | 9/1944 | Hickin et al. | 267/141.1 |
| 2,459,741 | 1/1949 | Kubaugh | 267/140.2 |
| 2,600,090 | 6/1952 | Barber et al. | 267/140.1 |
| 3,955,808 | 5/1976 | Jorn et al. | 267/152 |
| 4,151,822 | 5/1979 | Miura et al. | 123/192 R X |
| 4,183,496 | 1/1980 | Brock et al. | 248/638 |
| 4,660,797 | 4/1987 | Tonnies | 267/153 |

FOREIGN PATENT DOCUMENTS 3512555 11/1985 Fed. Rep. of Germany .
3000511C2 1/1987 Fed. Rep. of Germany .

*Primary Examiner*—Noah P. Kamen
*Attorney, Agent, or Firm*—R. L. Phillips

[57] ABSTRACT

A motor vehicle engine mount has two inner bodies which are directed toward each other and form a gap therebetween. Each of these bodies is connected to the interior of a frame via rubber webs and a connecting piece rigidly attached to one of the inner bodies is held in a sliding manner on the other inner body via a slot and a locking screw in the position which becomes established in the loaded resting state. And a release member is added between the screw and such other inner body that is able to freely move at small vibration amplitudes.

7 Claims, 4 Drawing Sheets

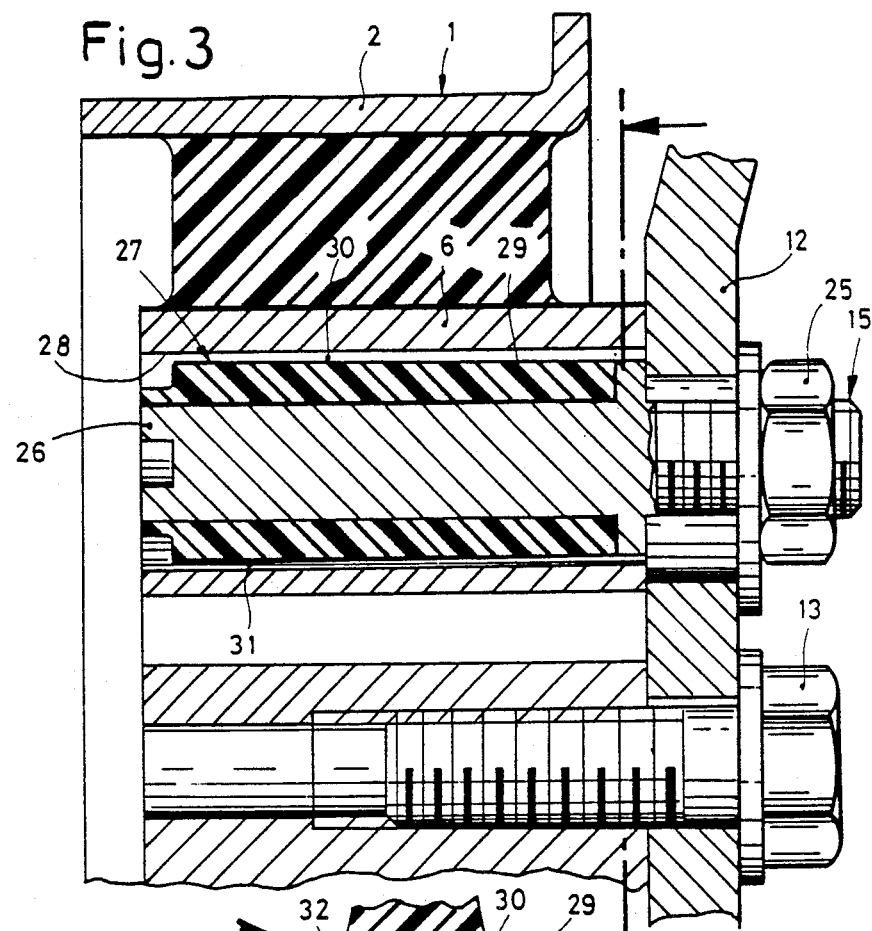
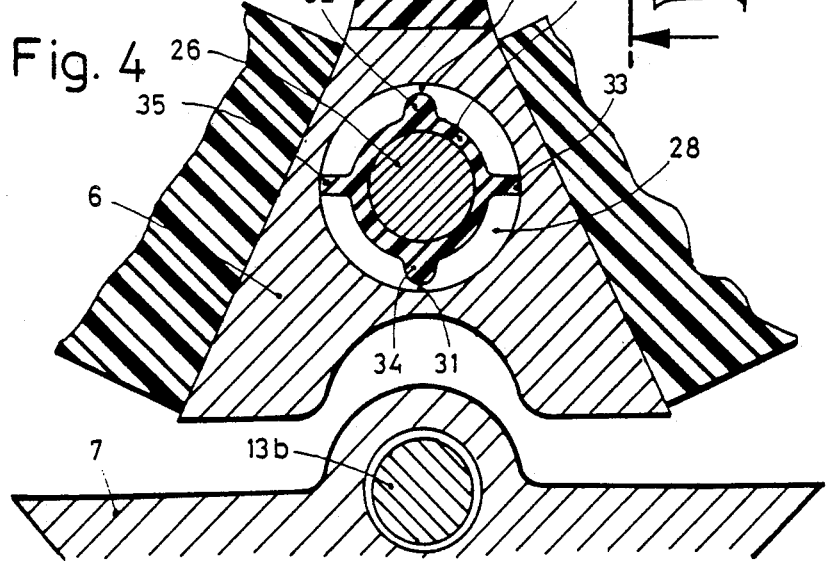

DAMPING BLOCK DESIGNED IN PARTICULAR FOR MOUNTING AN ENGINE IN A MOTOR VEHICLE

This is a continuation-in-part of application Ser. No. 135,009, filed Dec. 18, 1987, now U.S. Pat. No. 4,829,953.

TECHNICAL FIELD

The present invention relates to a mounting device for mounting an engine in a motor vehicle and more particularly to the damping blocks used therein.

BACKGROUND OF THE INVENTION

The damping blocks used in a motor vehicle engine suspension have the task of absorbing the vibrations induced by the pavement in the front zone of the vehicle body and also isolating engine vibrations from the body. The vibrations of the front zone of the body are usually in the range of 15 Hz. In contrast, the vibrations occurring during the operation of the engine have a substantially higher frequency and can be manifested mainly as an acoustic disturbance. It is therefore important to reach a compromise between controlling the vibrations of the front zone of the body and the vibrations occurring during the operation of the engine when selecting the hardness and the damping ability of the damping blocks. Where the damping blocks have rubber webs and these are too hard, the vibrations of the front zone of the body will be almost completely suppressed, but the vibrations occurring during the operation of the engine will be introduced into the body too strongly and lead to a reduction in the acoustic comfort. Not even strong damping in the case of soft rubber webs will completely prevent the transmission of high-frequency vibrations into the body, so that it is not possible to optimize the noise and vibrations into the body by strong damping.

According to German DE-OS No. 35 12, 555, a damping block may be optimized by making an inner portion from two inner bodies which are screwed together by means of a connecting piece. If the inner portion is loaded by the weight of the engine when such a damping block is mounted, it will move downward with its two inner bodies relative to an outer mounting portion. The upper inner body is then screwed upward by means of an adjusting square until it comes into contact with an intermediate layer of rubber in the upper damping block, thus becoming connected to the outer portion via the intermediate layer.

However, it is not possible to achieve load elimination from the upper intermediate rubber layer in the resting state of the engine with the above damping block, because the position in which the upper inner body reaches the rubber layer cannot be fixed in a reliable manner. Contact between the upper inner body and the rubber layer can only be inferred from the increased torque during the screwing upward of the inner body. However, this can also increase considerably for other reasons, e.g., due to tilting of the load to the suspension connection or to irregularities in the threads. Therefore, the desired noise comfort along with a high level of vibration comfort cannot be achieved even with such damping block.

SUMMARY OF THE PRESENT INVENTION

The present invention is directed to a damping body of the type specified in the introduction having upper rubber webs that are stress-free due to the reliable possibility of adjustment in the loaded resting position. As a result, sufficient softness can be achieved for noise comfort without diminishing the vibration comfort.

This task is accomplished according to the present invention by the rubber webs being nondetachably connected to the two inner bodies and the connecting piece bridging over the inner bodies in a releasable manner.

This possibility of disconnecting the connecting piece allows the lower inner body to be moved away from the upper inner body completely freely in the loaded resting position, with the connecting piece disconnected, until an equilibrium of forces becomes established due to the elasticity of the rubber parts. The connecting piece is only connected thereafter, so that the two inner bodies are connected to each other in the adjusted position, in which the upper rubber webs are not subject to force in the resting state. As a result, it is possible to achieve good noise comfort even at a high level of vibration comfort.

The effect of the damping block according to the present invention is based on the fact that only the soft spring rate of the lower rubber webs acts at least with respect to the high-frequency vibrations generated during the engine operation. As a consequence of this, the vibrations generated during operation are scarcely transmitted into the body. However, the upper inner part with its rubber webs comes into action against low-frequency vibrations in the front zone of the body because the engine seeks to yield in the upward direction to the vibrations in the front zone of the body, so that the rubber webs for the upper inner portion which is made of metal are subjected to pressure. This does not happen in the case of the conventional engine suspension; there, the inner portion made from metal is normally able to freely yield upward. According to the present invention, a doubled spring rate acts effectively against the relatively large deflections typical for the vibrations of the front zone of the body, whereas only a soft spring rate acts against the vibrations generated during the engine operation, which have a typically lower amplitude.

The present invention is especially advantageous in the case of transverse mounted engines because the engine first moves upward during acceleration. Since the upper inner body now moves against the upper webs, the lower webs are not subjected to excessive tensile stress.

The connecting piece is of an especially simple design in the form of a strip which is attached in a nonsliding manner to one of the inner bodies and is adjustably attached to the other inner body by means of a slot and a locking screw introduced through the slot. In such a connecting piece, only the locking screws of the damping blocks need to be tightened after the engine has been mounted to positively achieve and fix the optimal position of the opposite inner bodies. A subsequent adjustment is also possible in exactly the same manner if this position is no longer optimal because of a change in the hardness of the rubber webs due to aging.

The damping block according to the present invention possesses especially good vibration and damping properties by the inner bodies preferably each having approximately the shape of an isosceles trapezium, arranged with their longer base lines directed toward each other, forming a gap bridged over by the connecting piece and with a rubber web extending from each arm to the outer portion.

A further rubber web leading symmetrically to the outer portion between the other two rubber webs from the shorter base lines opposite the gap contributes to a reduction of the shear stress of the rubber webs according to another advantageous embodiment of the present invention.

The inner bodies, each with an extension directed symmetrically outward between the arms on their shorter base lines, from which extension the further rubber web leads to the said outer portion, contributes to an increase in the strength of the said damping block.

The damping block of the present invention is preferably constructed such that its upper rubber webs are stress-free in the loaded steady state due to the permitted adjustment, so that a sufficient softness for noise comfort can be achieved without detriment to the vibration comfort. However, the addition of the spring rate of the upper rubber webs to that of the lower rubber webs, which is brought about by the connecting piece, can possibly lead to an impairment of noise comfort in some cases.

To improve the damping block such that the noise comfort can be further increased without restriction of the vibration comfort, it is further contemplated that the strip be connected to one of the inner bodies through the intermediary of a release member that permits limited movement between the strip and the inner body.

Such a release member prevents the upper rubber webs from acting during a vertical vibration by an amount below a predetermined value. As a result, the upper rubber webs do not influence the overall spring rate of the damping block in the case of vibrations which are responsible for the acoustic comfort, so that high frequency vibrations are not transmitted.

The preferred release member is of a particularly simple design in the form of a column-like body that is provided within a recess of the inner body and has a small radial play at least in one direction within the recess.

A further simplification is achieved by forming the column-like body of the release member of metal and adding an elastic sleeve that has outwardly directed webs and sits on the column-like body, the webs being connected by the sleeve to the inner wall of the recess and other webs being spaced apart from the inner wall at a short distance.

For usual applications, it is sufficient if the release member as a whole has four webs aligned at right angles to each other, of which two vertically aligned webs are spaced a short distance from the inner wall of the recess and the other two webs are connected to the inner wall.

A particularly high level of noise comfort is reached where all webs of the sleeve are spaced at a short distance from the inner wall of the recess.

After the play between the webs and the inner wall of the recess is overcome, the increased spring rate begins relatively soft by the webs being convex in the direction of the longitudinal extension of the sleeve.

These and other objects, advantages and features of the present invention will become more apparent from the following description and drawing in which:

BRIEF DESCRIPTION OF THE DRAWINGS

FIG. 3 shows a section through the damping block along line 3—3 in FIG. 2.

FIG. 4 shows a section through the damping block along line 4—4 in FIG. 3.

DESCRIPTION OF THE PREFERRED EMBODIMENTS

Figure 1:
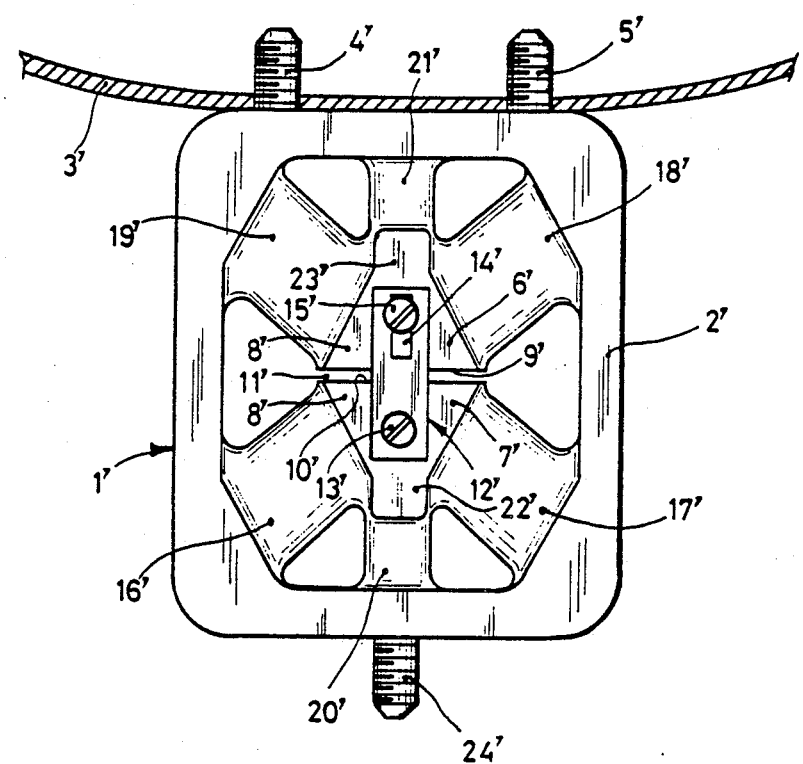
FIG. 1 is a side view of a first embodiment of a motor vehicle engine mount constructed according to the present invention.

The damping block 1' shown in FIG. 1 has a framelike outer portion 2' made of metal, from which two threaded bolts 4', 5' welded thereto extend upward for fastening to a vehicle body 3'. Two inner bodies 6', 7' made of metal, which together form an inner portion 8', are arranged inside the outer portion 2'. Each of the two inner bodies 6', 7' have approximately the shape of an isosceles trapezium whose longer base lines 9', 10' are directed toward each other, leaving a gap 11'. The gap 11' is bridged over by a connecting piece 12' in the form of a strip attached to the lower inner body 7' by means of a screw 13' passed through a round hole. On the opposite side, the connecting piece 12'has a slot 14' through which a locking screw 15, is introduced into the upper inner body 6'.

Rubber webs 16', 17' and 18', 19' lead from each of the surfaces forming the arms of the trapezium-shaped inner bodies 6', 7' to the outer portion 2', such rubber webs being rigidly attached to the said surfaces. A further rubber web 20°, 21' which leads from the outer portion 2' to the blunt end of downward and upward directed extension 22', 23', respectively, of the inner body 6', 7' is provided in the upward and downward directions between the rubber webs 16', 17' and 18', 19'.

For connecting the inner portion 8' consisting of the inner bodies 6', 7' to an engine (not shown), a threaded bolt 24' is rigidly attached such as by a weld to the inner body 7' and extends downward in a sliding manner through the outer portion 2'.

Figure 2:
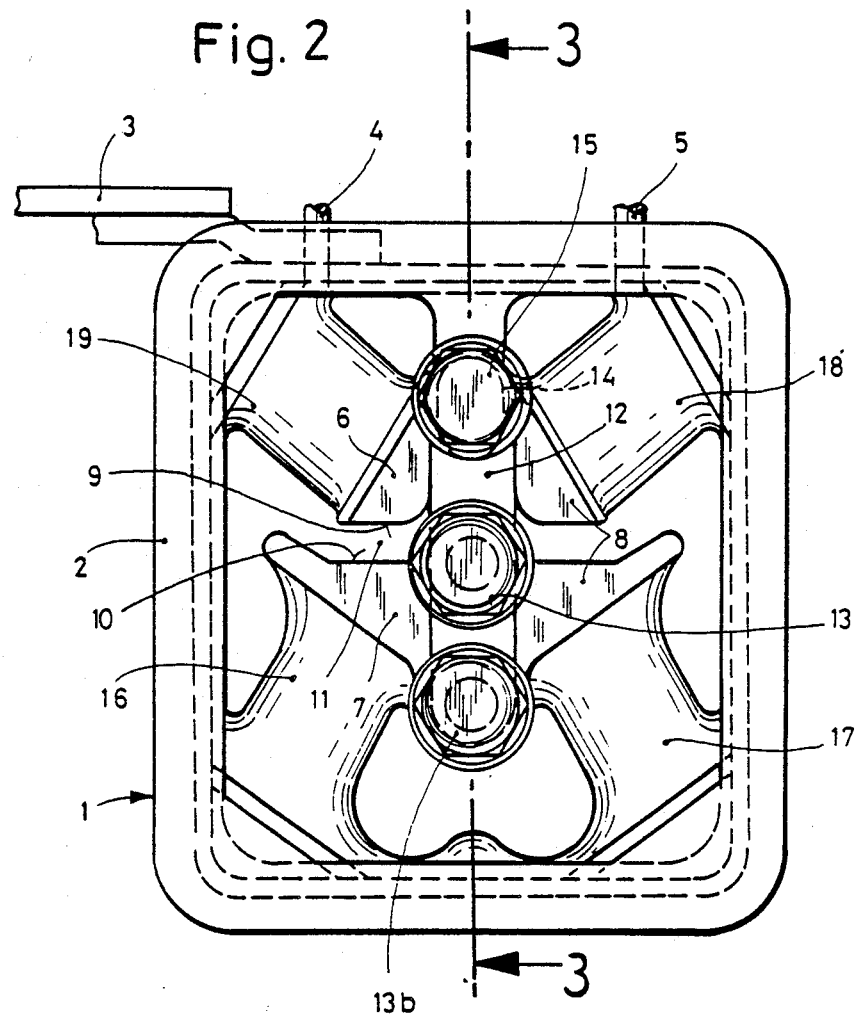
FIG. 2 shows a view of another embodiment of a damping block according to the present invention.

The damping block 1 shown in FIG. 2 has a framelike outer portion 2 made from metal, whose top side is connected to a vehicle body 3 by bolts 4 and 5 like the mount in FIG. 1. Inside the outer portion 2 are disposed two inner bodies 6 and 7 made from metal, which together form an inner portion 8 which is connected to an engine (not shown) by bolt means (not shown) like in FIG. 1. Each of the two inner bodies 6 and 7 have approximately the shape of an isosceles trapezoid whose longer base lines 9 and 10 face each other, leaving a free gap 11. This gap 11 is bridged by a connecting piece in the form of a strip 12 which is fixed to the lower inner body 7 by means of screws 13 and 13b. On the opposite side, the strip 12 is connected to the upper inner body 6 by means of a locking screw 15 passing through a slot like in FIG. 1. Rubber webs 16, 17, 18 and 19 lead to the outer portion 2 from the surfaces forming the legs of the trapezoidal inner bodies 6 and 7 also like in FIG. 1.

The fastening of the strip 12 by means of the locking screw 15 to the upper inner body 6 is important for the present invention. It can be seen in FIG. 3 that the strip 12 is screwed to a column-like body 26 of a release member 27 which is fixed in a recess 28 of the inner body 6 by means of a nut 25 on the locking screw 15. The column-like body 26, which is made from metal, is surrounded by an elastic sleeve 29 that is provided with a small play or clearance 30, 31 in the upward and downward directions in the recess.

FIG. 4 shows that the sleeve 29 has four outwardly directed webs 32, 33, 34, 35, of which the webs 32 and 34 do not touch the wall of the recess 28 and form the play 30, 31. The laterally aligned webs 33 and 35 are firmly attached to the inner wall of the recess 28 and thus they hold the body 26 in the center of the recess 28. FIG. 4 also shows a portion of the lower inner body 7 with the stem of the screw 13b.

Figure 5:
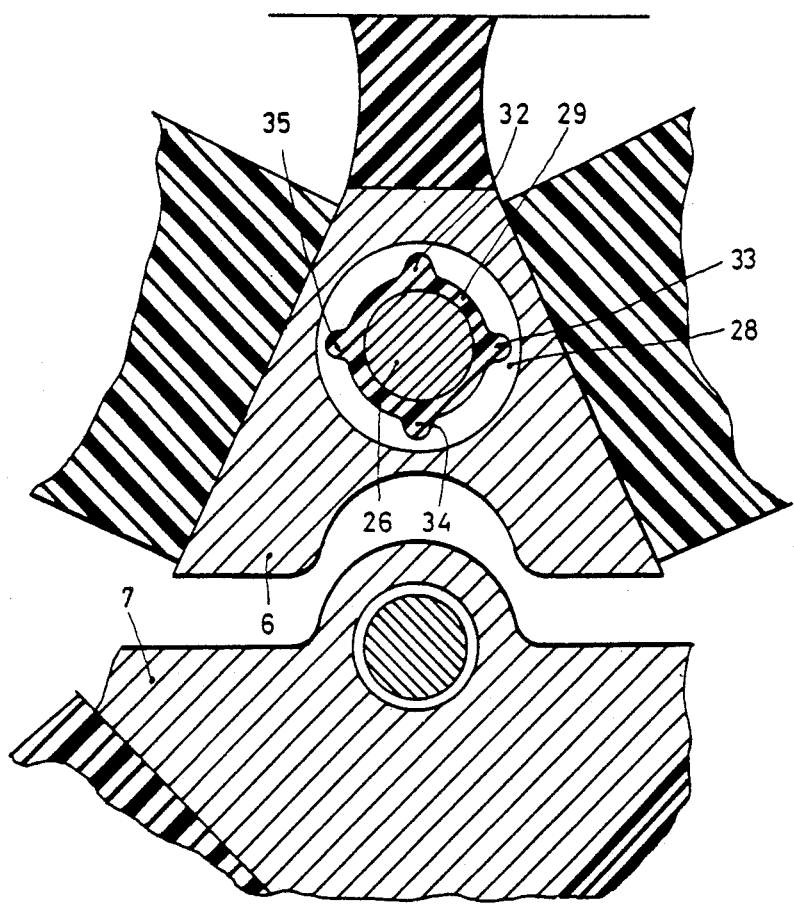
FIG. 5 shows a section through still another embodiment of the present invention corresponding to FIG. 2.

The embodiment according to FIG. 5 differs from the above-described one in that all four webs 32, 33, 34 and 35 are at spaced locations from the inner wall of the recess 28. The lower inner body 7 is thus able to freely vibrate with small amplitudes in all directions without influencing the upper inner body 6.

It is also contemplated that the elastomeric webs 32–35 may be convex in the longitudinal direction in the last two embodiments, so that toward the center of the inner body 6, they are spaced at a shorter distance from the inner wall of the recess 28 than on the two sides.

The foregoing description of the preferred embodiments of the invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. A motor vehicle engine mount comprising a rigid outer portion, a rigid inner portion connected to the outer portion by flexible rubber webs, said inner portion having two inner bodies which are opposite each other and spaced apart and which are connected to each other by an adjustable connecting piece for transmitting forces from one inner body to the other, characterized in that the rubber webs are connected non-releasably to the two inner bodies and the connecting piece includes adjustable securing means detachably bridging the inner bodies, and further characterized in that the connecting piece is connected to one of the inner bodies by a release member operating in a slot in the connecting piece that allows limited movement between the connecting piece and said one inner body.

2. A motor vehicle engine mount according to claim 1, further characterized in that the release member has a column-like body received inside a recess in said one inner body with slight radial play in at least one direction.

3. A motor vehicle engine mount according to claim 2, further characterized in that the column-like body of the release member is made of metal and on it is mounted a flexible sleeve having outwardly directed webs sleeve, selected ones of said webs contacting the inner wall of the recess and the other of said sleeve webs spaced a short distance from the inner wall.

4. A motor vehicle engine mount according to claim 3, further characterized in that the release member comprises a total of four sleeve webs aligned at right angles to each other, of which two sleeve webs are vertically aligned and spaced a short distance apart from the inner wall of the recess and the other two sleeve webs contact the inner wall.

5. A motor vehicle engine mount according to claim 4, further characterized in that the sleeve webs are convex in the longitudinal direction of the sleeve.

6. A motor vehicle engine mount according to claim 2, further characterized in that the column-like body of the release member is made of metal and on it is mounted a flexible sleeve having outwardly directed webs that are all spaced a predetermined distance apart from the inner wall of the recess.

7. A motor vehicle engine mount according to claim 6, further characterized in that the sleeve webs are convex in the longitudinal direction of the sleeve.

* * * * *